US008730959B1

(12) United States Patent
Williams et al.

(10) Patent No.: US 8,730,959 B1
(45) Date of Patent: *May 20, 2014

(54) SYSTEMS AND METHODS FOR ENDPOINT RECORDING USING A MEDIA APPLICATION SERVER

(75) Inventors: Jamie Richard Williams, Fleet (GB); Thomas Z. Dong, Marietta, GA (US)

(73) Assignee: Verint Americas Inc., Alpharetta, GA (US)

( * ) Notice: Subject to any disclaimer, the term of this patent is extended or adjusted under 35 U.S.C. 154(b) by 340 days.

This patent is subject to a terminal disclaimer.

(21) Appl. No.: 12/769,552

(22) Filed: Apr. 28, 2010

Related U.S. Application Data

(63) Continuation of application No. 11/395,759, filed on Mar. 31, 2006, now Pat. No. 8,204,056.

(51) Int. Cl.
*H04L 12/28* (2006.01)
*H04M 3/00* (2006.01)

(52) U.S. Cl.
USPC ..................... 370/390; 379/265.06

(58) Field of Classification Search
CPC combination set(s) only.
See application file for complete search history.

(56) References Cited

U.S. PATENT DOCUMENTS

| | | |
|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |

(Continued)

FOREIGN PATENT DOCUMENTS

| | | |
|---|---|---|
| EP | 0453128 A2 | 10/1991 |
| EP | 0773687 A2 | 5/1997 |

(Continued)

OTHER PUBLICATIONS

U.S. Official Action dated Mar. 2, 2011 in U.S. Appl. No. 11/395,759.

(Continued)

*Primary Examiner* — Clemence Han
(74) *Attorney, Agent, or Firm* — Meunier Carlin & Curfman

(57) ABSTRACT

Embodiments of the present invention provide systems and methods for recording media communication. An exemplary method comprises the steps of: receiving an incoming communication from a first communication device; routing the incoming communication to a second communication device in a call center; transmitting media communications associated with the incoming media communication between the first communication device and the second communication device through a media application server; duplicating the media communications via the media application server; transmitting the duplicated media communications via the media application server; and recording the duplicated media communications.

18 Claims, 11 Drawing Sheets

(56) References Cited

U.S. PATENT DOCUMENTS

| | | |
|---|---|---|
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,867,559 A | 2/1999 | Jorgensen et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,084,581 A * | 7/2000 | Hunt .............. 715/202 |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,263,049 B1 | 7/2001 | Kuhn |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,574 B1 | 4/2002 | House et al. |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazar |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,751,297 B2 | 6/2004 | Nelkenbaum |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 7,043,008 B1 | 5/2006 | Dewan |
| 7,613,290 B2 | 11/2009 | Williams et al. |
| 8,130,938 B2 | 3/2012 | Williams et al. |
| 2001/0000962 A1 | 5/2001 | Rajan |
| 2001/0032335 A1 | 10/2001 | Jones |
| 2001/0043697 A1 | 11/2001 | Cox et al. |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0075880 A1 | 6/2002 | Dolinar et al. |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0055883 A1 | 3/2003 | Wiles et al. |
| 2003/0079020 A1 | 4/2003 | Gourraud et al. |
| 2003/0144900 A1 | 7/2003 | Whitmer |
| 2003/0154240 A1 | 8/2003 | Nygren et al. |
| 2004/0034672 A1 | 2/2004 | Inagaki |
| 2004/0083099 A1 | 4/2004 | Scarano et al. |
| 2004/0100507 A1 | 5/2004 | Hayner et al. |
| 2004/0165717 A1 | 8/2004 | McIlwaine et al. |
| 2004/0247205 A1 | 12/2004 | Nagaya et al. |
| 2005/0018622 A1 | 1/2005 | Halbraich et al. |
| 2005/0053073 A1 | 3/2005 | Kloth et al. |
| 2005/0074026 A1 | 4/2005 | Soncodi et al. |

(56) References Cited

U.S. PATENT DOCUMENTS

| | | | |
|---|---|---|---|
| 2005/0138560 A1 | 6/2005 | Lee et al. | |
| 2006/0067309 A1 | 3/2006 | Zhakov et al. | |
| 2007/0121602 A1 | 5/2007 | Sin et al. | |
| 2007/0121885 A1 | 5/2007 | Sin et al. | |
| 2007/0230444 A1 | 10/2007 | Williams et al. | |
| 2007/0263787 A1 | 11/2007 | Dong et al. | |
| 2008/0082669 A1 | 4/2008 | Williams et al. | |
| 2009/0016522 A1* | 1/2009 | Torres et al. | 379/265.06 |

FOREIGN PATENT DOCUMENTS

| | | |
|---|---|---|
| EP | 0989720 | 3/2000 |
| GB | 2369263 | 5/2002 |
| WO | WO98/43380 | 11/1998 |
| WO | WO00/16207 | 3/2000 |

OTHER PUBLICATIONS

"Customer Spotlight: Navistar International," Web page, unverified print date of Apr. 1, 2002.
DKSystems Integrates QM Perception with OnTrack for Training, Web page, unverified print date of Apr. 1, 2002, unverified cover date of Jun. 15, 1999.
"OnTrack Online Delivers New Web Functionality," Web page, unverified print date of Apr. 2, 2002, unverified cover date of Oct. 5, 1999.
"Price Waterhouse Coopers Case Study: The Business Challenge," Web page, unverified cover date of 2000.
Abstract, networking: "An Online Webliography," Technical Training pp. 4-5 (Nov./Dec. 1998).
Adams et al., "Our Turn-of-the-Century Trend Watch" Technical Training, pp. 46-47 (Nov./Dec. 1998).
Barron, "The Road to Performance: Three Vignettes," Technical Skills and Training, pp. 12-14 (Jan. 1997).
Bauer, "Technology Tools: Just-in-Time Desktop Training is Quick, Easy, and Affordable," Technical Training, pp. 8-11 (May/Jun. 1998).
Beck et al., "Applications of AI in Education," AMC Crossroads vol. 1:1-13 (Fall 1996), Web page, unverified print date of Apr. 12, 2002.
Benson and Cheney, "Best Practices in Training Delivery," Technical Training pp. 14-17 (Oct. 1996).
Bental and Cawsey, "Personalized and Adaptive Systems for Medical Consumer Applications," Communications ACM 45(5):62-63 (May 2002).
Witness Systems promotional brochure for eQuality entitled "Building Customer Loyalty Through Business-Driven Recording of Multimedia Interactions in your Contact Center" (2000).
Benyon and Murray, "Adaptive Systems: from intelligent tutoring to autonomous agents," pp. 1-52, Web page, unknown date.
Blumenthal et al., "Reducing Development Costs with Intelligent Tutoring System Shells," pp. 1-5, Web page, unverified print date of Apr. 9, 2002, unverified cover date of Jun. 10, 1996.
Brusilovsky et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.
Brusilovsky and Pesin, ISIS-Tutor: An Intelligent Learning Environment for CD/ISIS Users, @pp. 1-15 Web page, unverified print date of May 2, 2002.
Brusilovsky, "Adaptive Educational Systems on the World-Wide-Web: A Review of Available Technologies," pp. 1-10, Web Page, unverified print date of Apr. 12, 2002.
Byrnes et al., "The Development of a Multiple-Choice and True-False Testing Environment on the Web," pp. 1-8, Web page, unverified print date Apr. 12, 2002, unverified cover date of 1995.
Calvi and De Bra, "Improving the Usability of Hypertext Courseware through Adaptive Linking," ACM, unknown page numbers (1997).
Coffey, "Are Performance Objectives Really Necessary?" Technical Skills and Training pp. 25-27 (Oct. 1995).
Cohen, "Knowledge Management's Killer App," pp. 1-11, Web page, unverified print date of Apr. 12, 2002, unverified cover date of 2001.

Cole-Gomolski, "New ways to manage E-Classes," Computerworld 32(48):4344 (Nov. 30, 1998).
Cross, "Sun Microsystems—the SunTAN Story," Internet Time Group 8 (2001).
Cybulski and Linden, "Teaching Systems Analysis and Design Using Multimedia and Patterns," unknown date, unknown source.
De Bra et al., "Adaptive Hypermedia: From Systems to Framework," ACM (2000).
De Bra, "Adaptive Educational Hypermedia on the Web," Communications ACM 45(5):60-61 (May 2002).
Dennis and Gruner, "Computer Managed Instruction at Arthur Andersen & Company: A Status Report," Educational Technical, pp. 7-16 (Mar. 1992).
Diessel et al., "Individualized Course Generation: A Marriage Between CAL and ICAL," Computers Educational 22(1/2) 57-64 (1994).
Dyreson, "An Experiment in Class Management Using the World-Wide Web," pp. 1-12, Web page, unverified print date of Apr. 12, 2002.
E Learning Community, "Excellence in Practice Award: Electronic Learning Technologies," Personal Learning Network pp. 1-11, Web page, unverified print date of Apr. 12, 2002.
Eklund and Brusilovsky, "The Value of Adaptivity in Hypermedia Learning Environments: A Short Review of Empirical Evidence," pp. 1-8, Web page, unverified print date of May 2, 2002.
e-Learning the future of learning, THINQ Limited, London, Version 1.0 (2000).
Eline, "A Trainer's Guide to Skill Building," Technical Training pp. 34-41 (Sep./Oct. 1998).
Eline, "Case Study: Bridging the Gap in Canada's IT Skills," Technical Skills and Training pp. 23-25 (Jul. 1997).
Eline, "Case Study: IBT's Place in the Sun," Technical Training pp. 12-17 (Aug./Sep. 1997).
Fritz, "CB templates for productivity: Authoring system templates for trainers," Emedia Professional 10(8):6876 (Aug. 1997).
Fritz, "ToolBook II: Asymetrix's updated authoring software tackles the Web," Emedia Professional 10(2):102106 (Feb. 1997).
Gibson et al., "A Comparative Analysis of Web-Based Testing and Evaluation Systems," pp. 1-8, Web page, unverified print date of Apr. 11, 2002.
Hallberg and DeFiore, "Curving Toward Performance: Following a Hierarchy of Steps Toward a Performance Orientation," Technical Skills and Training pp. 9-11 (Jan. 1997).
Harsha, "Online Training "Sprints" Ahead," Technical Training pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," Technical Skills and Training pp. 5-7 (May/Jun. 1996).
Hollman, "Train Without Pain: the Benefits of Computer-Based Training Tools," pp. 1-11, Web page, unverified print date of Mar. 20, 2002, unverified cover date of Jan. 1, 2000.
Koonce, "Where Technology and Training Meet," Technical Training pp. 10-15 (Nov./Dec. 1998).
Kursh, "Going the distance with Web-based training," Training and Development 52(3):5053 (Mar. 1998).
Larson, "Enhancing Performance Through Customized Online Learning Support," Technical Skills and Training pp. 25-27 (May/Jun. 1997).
Linton et al., "OWL: A Recommender System for Organization-Wide Learning," Educational Technical Society 3 (1):62-76 (2000).
Lucadamo and Cheney, "Best Practices in Technical Training," Technical Training pp. 21-26 (Oct. 1997).
McNamara, "Monitoring Solutions: Quality Must Be Seen and Heard," Inbound/Outbound pp. 66-67 (Dec. 1989).
Merrill, "The New Component Design Theory: Instruction design for courseware authoring," Instructional Science 16:19-34 (1987).
U.S. Official Action dated Apr. 4, 2012 in U.S. Appl. No. 12/769,545.
U.S. Official Action dated Aug. 16, 2012 in related U.S. Appl. No. 12/770,517.
Kane, AOL-Tivo: You've Got Interactive TV, ZDNN, Aug. 17, 1999.
Kay, "E-Mail in Your Kitchen", PC World Online, Mar. 28, 1996.

(56) References Cited

OTHER PUBLICATIONS

Kenny, "TV Meets Internet", PC World Online, Mar. 28, 1996.
Linderholm, "Avatar Debuts Home Theater PC", PC World Online, Dec. 1, 1999.
Mendoza, "Order Pizza While You Watch", ABCNews.com, Dec. 13, 1999.
Moody, "WebTV: What the Big Deal?", ABCNews.com, Dec. 13, 1999.
Murdorf et al., "Interactive Television—Is There Life After the Internet?", Interactive TV News, Dec. 9, 1999.
Needle, "PC, TV or Both?", PC World Online, Dec. 14, 1999.
Interview with Steve Perlman, CEO of Web-TV Networks, PC World Online, Dec. 14, 1999.
Press, Two Cultures, The Internet and Interactive TV, Universite de Montreal, Dec. 9, 1999.
Reuters, "Will TV Take Over Your PC?", PC World Online, Dec. 14, 1999.
Rohde, "Gates Touts Interactive TV", InfoWorld, Oct. 14, 1999.
Ross, "Broadcasters Use TV Signals to Send Data", PC World, Oct. 1996.
Schlisserman, "Is Web TV a Lethal Weapon?", PC World Online, Nov. 14, 1996.
Stewart, "Interactive Television at Home: Television Meets the Internet", Aug. 1998.
Swedlow, "Computer TV Shows: Ready for Prime Time?", PC World Online, Jan. 1997.
Wilson, "U.S. West Revisits Interactive TV", Interactive Week, Nov. 28, 1999.
Klein, "Command Decision Training Support Technology," Web page, unverified print date of Apr. 12, 2002.
Minton-Eversole, "IBT Training Truths Behind the Hype," Technical Skills and Training pp. 15-19 (Jan. 1997).
Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Learning a Reading Tutor that Listens" American Association for Artificial Intelligence, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc., USA.
Nelson et al., "The Assessment of End-User Training Needs," Communications ACM 38(7):27-39 (Jul. 1995).
O'Herron, "CenterForce Technologies' CenterForce Analyzer," Web page, unverified print date of Mar. 20, 2002, unverified cover date of Jun. 1, 1999.
O'Roark, "Basic Skills Get a Boost," Technical Training pp. 10-13 (Jul./Aug. 1998).
Pamphlet, "On Evaluating Educational Innovations," authored by Alan Lesgold, unverified cover date of Mar. 5, 1998.
Papa et al., "A Differential Diagnostic Skills Assessment and Tutorial Tool," Computer Education 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark Web product," Web page, unverified print date of Apr. 1, 2002.
Phaup, "QM Perception Links with Integrity Training's WBT Manager to Provide Enhanced Assessments for Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available to high-volume users," Web page, unverified print date of Apr. 1, 2002, unverified cover date of May 6, 1996.
Piskurich, "Now-You-See-'Em, Now-You-Don't Learning Centers," Technical Training pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," Technical Skills and Training pp. 6-8 (May/Jun. 1995).
Stormes, "Case Study: Restructuring Technical Training Using ISD," Technical Skills and Training pp. 23-26 (Feb./Mar. 1997).
Tennyson, "Artificial Intelligence Methods in Computer-Based Instructional Design," Journal of Instruction Development 7(3):17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," ACM pp. 194-198 (1997).
Uiterwijk et al., "The virtual classroom," InfoWorld 20(47):6467 (Nov. 23, 1998).
Unknown Author, "Long-distance learning," InfoWorld 20(36):7276 (1998).
Untitled, 10th Mediterranean Electrotechnical Conference vol. 1 pp. 124-126 (2000).
Watson and Belland, "Use of Learner Data in Selecting Instructional Content for Continuing Education," Journal of Instructional Development 8(4):29-33 (1985).
Weinschenk, "Performance Specifications as Change Agents," Technical Training pp. 12-15 (Oct. 1997).
Witness Systems promotional brochure for eQuality entitled "Bringing eQuality to eBusiness." Sep. 1999.
Aspect Call Center Product Specification, "Release 2.0", Aspect Telecommunications Corporation, May 23, 1998, 798.
Metheus X Window Record and Playback, XRP Features and Benefits, 2 pages, Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 11, 1999.
Ante, "Everything You Ever Wanted to Know About Cryptography Legislation . . . (But Were too Sensible to Ask)", PC World Online, Dec. 14, 1999.
Berst, "It's Baa-aack. How Interactive TV is Sneaking Into Your Living Room", The AnchorDesk, May 10, 1999.
Berst, "Why Interactive TV Won't Turn You On (Yet)", The AnchorDesk, Jul. 13, 1999.
Borland and Davis, "US West Plans Web Services on TV", CNETNews.com, Nov. 22, 1999.
Brown, "Let PC Technology Be Your TV Guide", PC Magazine, Jun. 7, 1999.
Brown, "Interactive TV: The Sequel", NewMedia, Feb. 10, 1998.
Cline, "Deja vu—Will Interactive TV Make It This Time Around?", DevHead, Jul. 9, 1999.
Crouch, "TV Channels on the Web", PC World, Sep. 15, 1999.
D'Amico, "Interactive TV Gets $99 set-top box", IDG.net, Oct. 6, 1999.
Davis, "Satellite Systems Gear Up for Interactive TV Fight", CNETNews.com, Sep. 30, 1999.
Diederich, "Web TV Data Gathering Raises Privacy Concerns", ComputerWorld, Oct. 13, 1998.
Digital Broadcasting, Interactive TV News, Dec. 9, 1999.
EchoStar, "MediaX Mix Interactive Multimedia With Interactive Television", PRNews Wire, Jan. 11, 1999.
Furger, "The Internet Meets the Couch Potato", PCWorld, Oct. 1996.
"Hong Kong Comes First with Interactive TV", SCI-TECH, Dec. 4, 1997.
"Interactive TV Overview TimeLine", Interactive TV News, Jan. 13, 1999.
"Interactive TV Wars Heat Up", Industry Standard, Nov. 10, 1998.
Needle, "Will the Net Kill Network TV?" PC World Online, Mar. 10, 1999.

* cited by examiner

SYSTEMS AND METHODS FOR ENDPOINT RECORDING USING A MEDIA APPLICATION SERVER

CROSS-REFERENCE TO RELATED APPLICATION

This application is a continuation of U.S. patent application Ser. No. 11/395,759, filed on Mar. 31, 2006, the contents of which are incorporated herein by reference in its entirety.

TECHNICAL FIELD

The present invention is generally related to recording of communication signals and, more particularly, is related to systems and methods for recording communication signals through a contact center.

BACKGROUND

A traditional passive tap recording technique includes recorders that are deployed along routes of communications. In this technique, each recorder operates similar to a "sniffer" by analyzing pass-by communication packets. The recorder records the packets corresponding to certain communication sessions based on its configuration. FIG. 1 shows a typical deployment of passive tap recorders in a contact center. In an IP telephony environment, recorders are typically deployed either at the voice gateway, which interfaces between Internet Protocol (IP) network and public switched telephone network (PSTN), or at switches in order to stay along the routes of the communications. This technique has the advantages of (1) minimum intrusion to a communication system, (2) cost effectiveness in deployment for companies with centralized office locations, and (3) easy scalability for compliance recording. However, for companies with many distributed branch offices, the above advantages start to diminish. This is especially true if the purpose of the recorders is for quality monitoring.

First, with the growing usage of Voice over Internet Protocol (VoIP) technology, many telephony-based businesses, such as contact centers, are adopting distributed telephony systems with local access to PSTN, which are still controlled by centralized soft switches. Many contact centers are using at-home agents with soft-phones on their personal computers (PCs). The distributed telephony system makes "recording along the communication routes", needed for passive tap recording, difficult. Secondly, network security has now become a concern. The deployment of encryption technology has made passive tap recording become even more problematic.

In addition, many contact centers deploy recorders for quality monitoring purpose, instead of compliance. In this regard, only a small percentage of the communications are recorded and monitored. However, to assure the accuracy of the sampling, communications are randomly selected for recording across all branch offices. With passive tap recording, a large number of recorders will be required and each recorder will have very low usage.

A typical IP-based contact center using the passive tapping "sniffing" recording method is shown in FIG. 1. Two branch offices are shown in the figure. To communicate with any agents at the contact center, a customer communication device, such as a time domain multiplexing (TDM) or an IP phone, first sends communication signals to a call-processing device of the contact center, such as a soft switch. The communication signals can be sent either directly to the call-processing device in case of IP to IP communications or via a media processing device, such as a voice gateway in case of TDM to IP. The communication network can be a PSTN network or IP-based network. Once the communication signals have been received, the call-processing device then routes the communication signals to an agent phone.

After several rounds of communication signals exchange, media communications between the agent's phone and customer's phone can proceed via media processing device and distribution devices. The distribution devices are network routers and switches. In order to record the media communications using passive tapping, recorders are deployed at the media processing device or distribution devices using the network traffic monitoring or duplicating features, such as the Cisco's Switch Port Analyzer (SPAN) feature, on these devices. These tapping features are often available to the recorders that are directly connected to the media processing device or distribution devices, namely to recorders deployed at each branch office. Hence, a large contact center having multiple branches, such as a branch in New York, a branch in Los Angeles, and a branch in Chicago, may need multiple recorders in each branch to record the media communications.

SUMMARY

Systems and methods for recording media communication are provided. An exemplary method comprises the steps of: receiving an incoming communication from a first communication device; routing the incoming communication to a second communication device in a call center; transmitting media communications associated with the incoming media communication between the first communication device and the second communication device through a media application server; duplicating the media communications via the media application server; transmitting the duplicated media communications via the media application server; and recording the duplicated media communications.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Disclosed herein are systems and methods for recording communication signals without requiring recording devices to be deployed along the route of the two end points of the communication. In particular, the recording of the communication signals can be achieved using a soft switch, a conference bridge, a phone, a media communication device, and/or a media application server.

Exemplary systems are first discussed with reference to the figures. Although these systems are described in detail, they are provided for purposes of illustration only and various modifications are feasible. After the exemplary systems are described, examples of flow diagrams and sequence diagrams of the systems are provided to explain the manner in which communication signals can be recorded.

Figure 1:
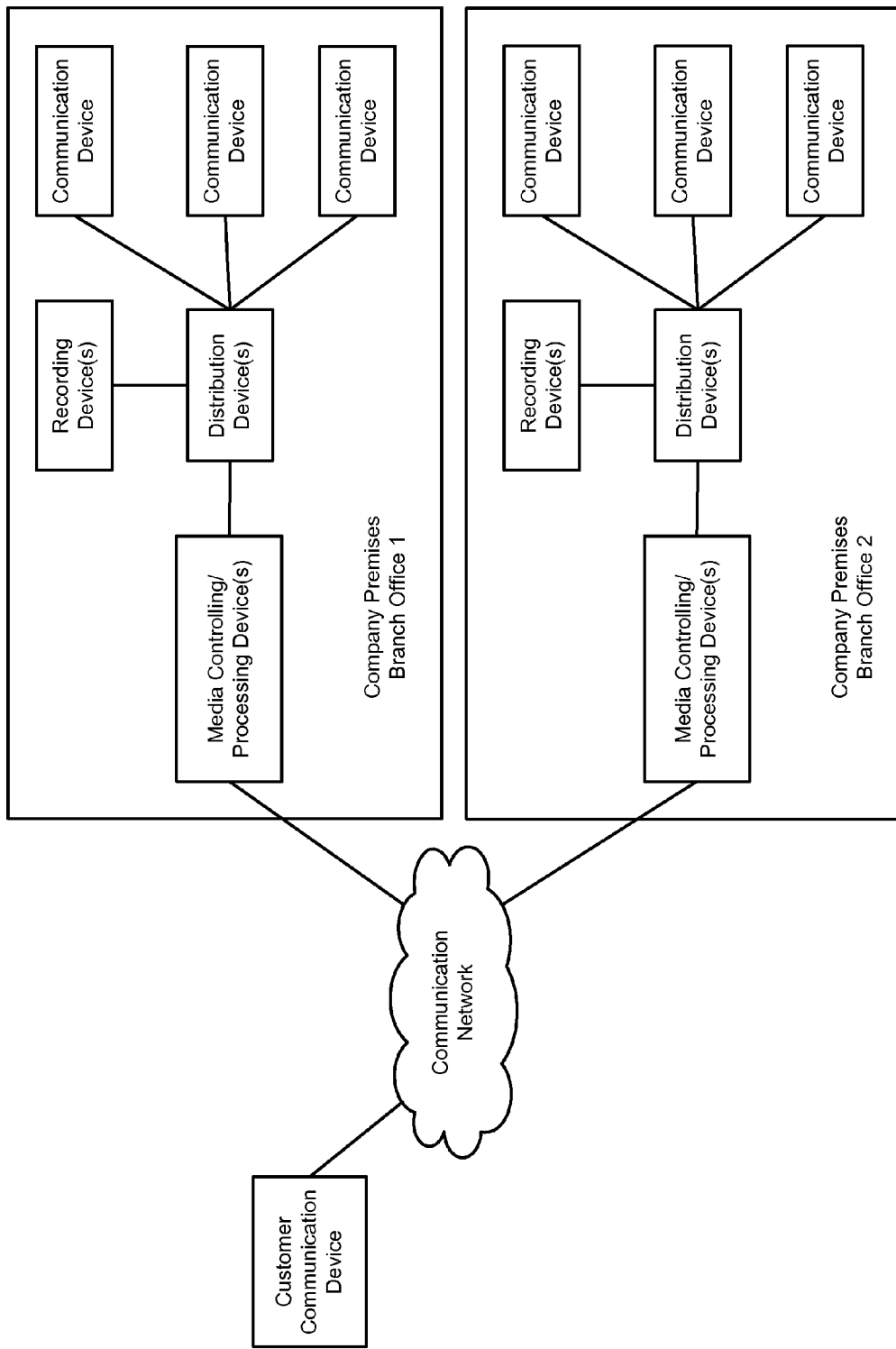
FIG. 1 is a schematic diagram of an embodiment of a system for passive tap recording.
Figure 2:
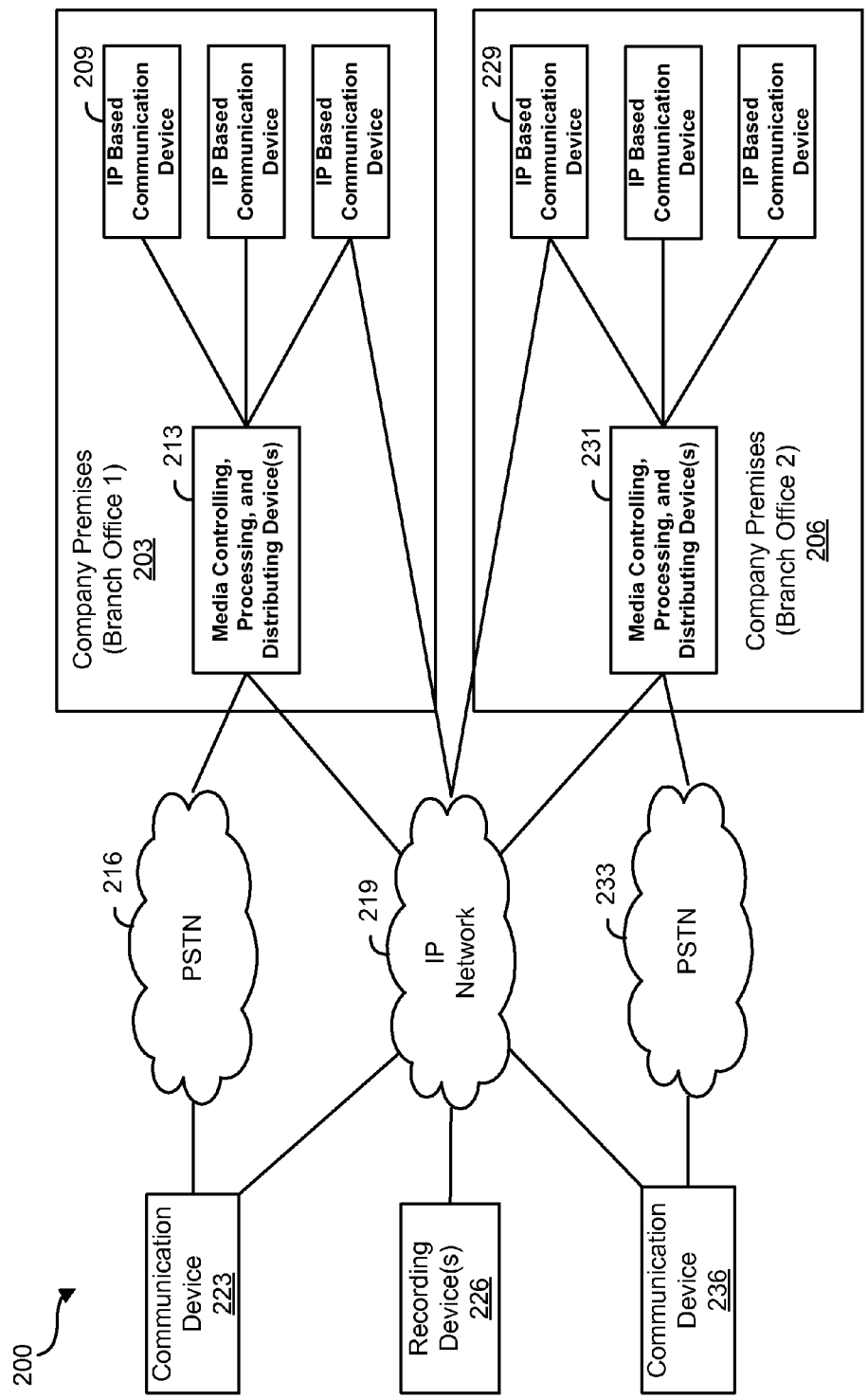
FIG. 2 is a schematic diagram of an embodiment of a system in which media communication at a company can be recorded by an endpoint recorder located anywhere on an IP network connected to the company.

Referring now in more detail to the figures, FIG. 2 is a schematic diagram of an embodiment of a system in which media communication at a company can be recorded by an endpoint recorder located anywhere on an IP network connected to the company. Two branch offices 203, 206 of a company may need to record communications between employees and between employees and customers. Customer communication devices 223, 236 connect to branch offices 203, 206 either via an IP network 219 or via a PSTN network 216, 233, respectively. The customer communication devices 223, 236 can include, but are not limited to, telephones, soft-phones on hand held devices, or Personal Computers.

Recording device(s) 226 can be deployed anywhere on the IP network 219 connected to the branch offices 203, 206. Alternatively or additionally, the recording devices 226 can communicate with media controlling/processing/distributing devices 213, 231 in a secure fashion in encrypted environments, for getting communication events and for sending instructions. With the capability of the recording devices 226 to communicate with the media controlling/processing/distributing devices 213, 231, the recording device 226 can selectively record communications in the contact center based on business policy. Alternatively or additionally, if a recording device is a cluster of recording devices, the recording device can communicate with the media controlling/processing/distributing devices 213, 231 to select which recording device from the cluster of recording devices to record the communications for load balancing purposes.

The media controlling/processing devices control the communication between customers and employees and between employees. The media controlling/processing devices can include, but are not limited to, voice gateways, soft switches, conference bridges, and multi-media application servers. The distributing devices can include, but are not limited to, routers and switches. Based on static configuration or instructions from the recording devices, the media controlling/processing devices can duplicate and transmit on-going communication between communication devices 209, 229, 223, 236 to the recording devices via the IP network 219 using its media processing features. Alternatively or additionally, the media controlling/processing devices can also instruct a communication device 209, 229 at the company premises 203, 206, respectively, to duplicate and transmit any on-going communications to the recording devices 226 using media processing features on the communication devices 209, 229. The operation of the system 200 is further described in relation to FIG. 8.

Figure 3:
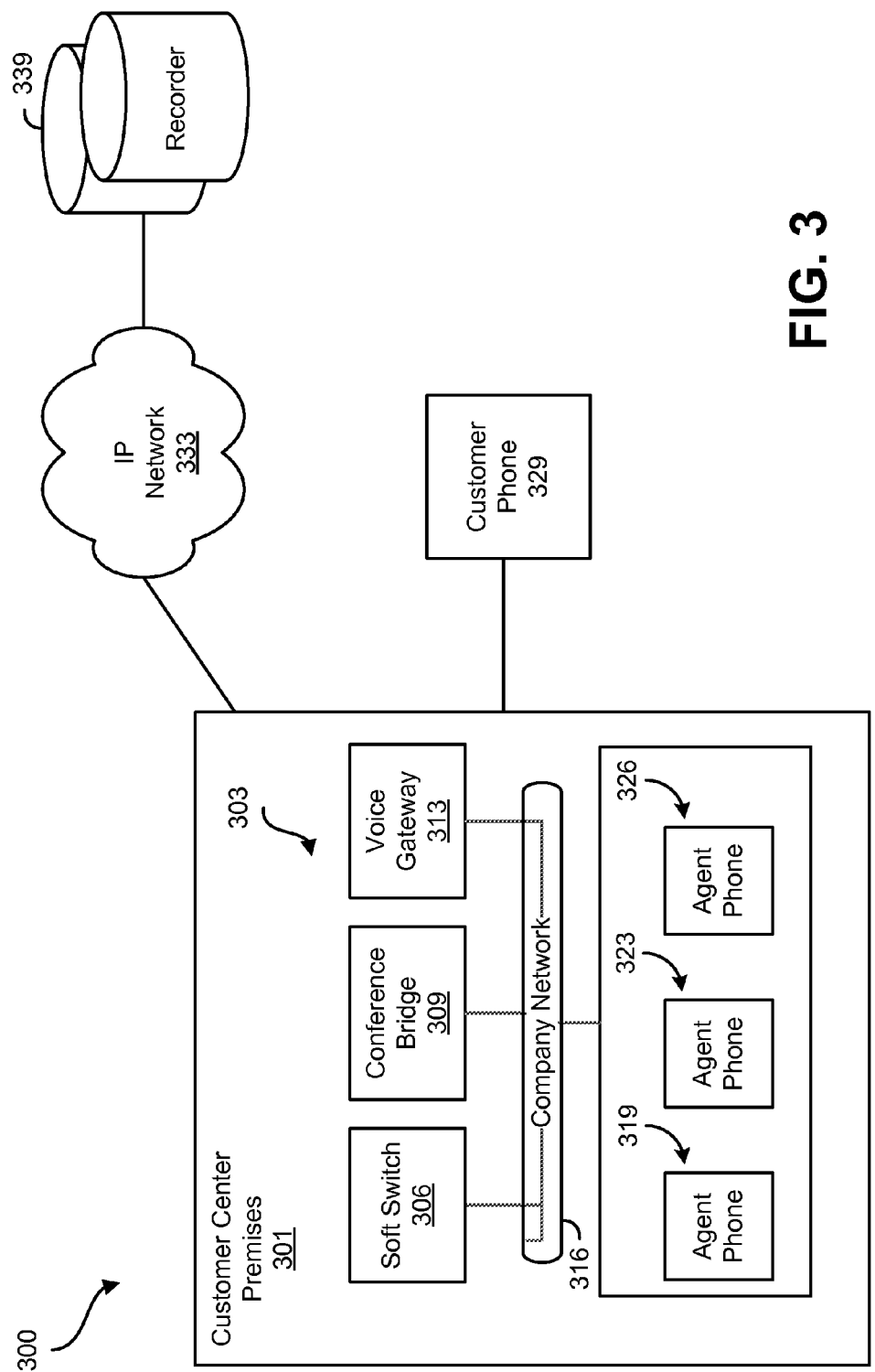
FIG. 3 is a schematic diagram of an embodiment of a system in which media communication at a contact center can be recorded by a voice endpoint recorder located anywhere on an IP network connected to the contact center using a conference bridge.

FIG. 3 is a schematic diagram of an embodiment of a system in which media communication at a contact center can be recorded by a voice endpoint recorder located anywhere on an IP network connected to the contact center using a conference bridge. As indicated in this figure, the system 300 comprises a contact center premises 301 that includes an IP telephony system 303 that enables communications between agent phones 319, 323, 326 and between agent phones and customer phone(s) 329. The IP telephony system 303 includes soft switch 306, conference bridge 309, voice gateway 313 and agent phones 319, 323, 326, all of which are connected to a company network 316. Calls from the customer phone 329 can be routed to a voice gateway 313, which can route the calls to the soft switch 306. The soft switch 306 receives incoming calls and routes the calls to the agent phones 319, 323, 326. The soft switch 306 communicates with the conference bridge 309 via the company network 316. The IP telephony system 303 communicates with a voice endpoint recorder 339 via an IP network 333. The company network 316 and IP network 333 can include, but are not limited to, a wide area network (WAN), a local area network (LAN), a virtual private network (VPN) and the Internet.

In this embodiment, the soft switch 306 is operative to send a command to the agent phones 319, 323, 326 and voice gateway 306 via the company network 316, instructing the agent phones 319, 323, 326 and voice gateway 306 to transmit media communications associated with the incoming calls through the conference bridge 309 via the company network 316. The soft switch 306 also sends a command to the conference bridge 309 via the company network 316 to duplicate and transmit the media communication to the voice endpoint recorder 339 using the IP network 333. The operation of the system 300 is further described in relation to FIGS. 8 and 9.

Alternatively or additionally, the soft switch can receive instructions for recording the media communication from the voice endpoint recorder 339 via the IP network 333. In turn, the soft switch sends a command based on the received instructions to the conference bridge 309. Alternatively or additionally, the soft switch 306 can have capabilities of a conference bridge. That is, the soft switch 306 can duplicate and transmit the media communication to the voice endpoint recorder 339 without using the conference bridge 309.

Figure 4:
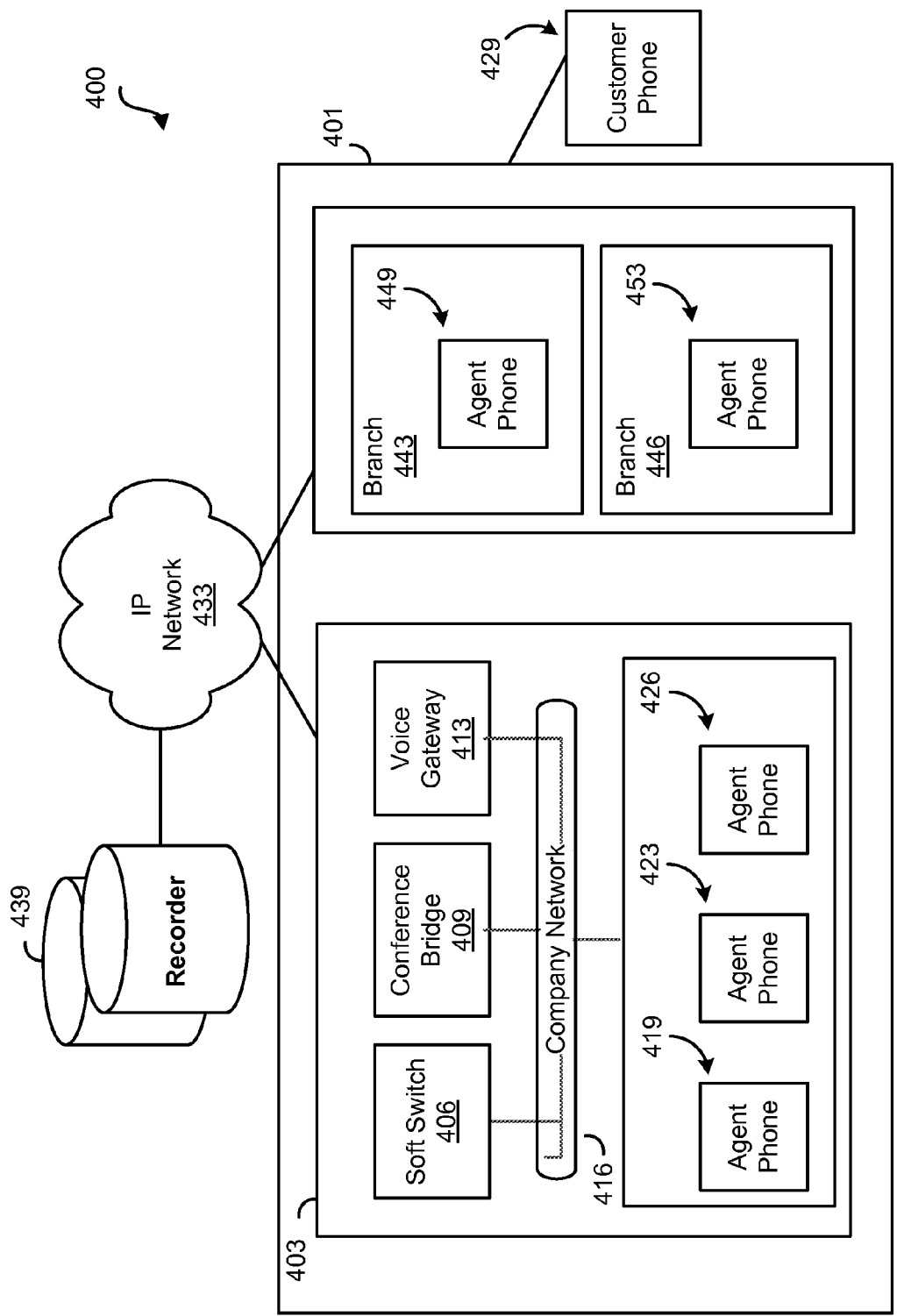
FIG. 4 is a schematic diagram of an embodiment of a system in which media communication at a contact center with multiple branch offices can be recorded by a voice endpoint recorder located anywhere on an IP network connected to the contact center using a conference bridge.

FIG. 4 is a schematic diagram of an embodiment of a system in which media communication at a contact center with multiple branch offices can be recorded by a voice endpoint recorder located anywhere on an IP network connecting to the contact center using a conference bridge. System 400 is similar to the system 300 in FIG. 3 described above. That is, the system 400 includes a contact center premises 401, customer phone 429, company network 416, voice gateway 413, IP network 433, soft switch 406, agent phones 419, 423, 426 and endpoint recorder 439.

As shown in FIG. 4, the contact center premises 401 further includes headquarters 403 that communicates with branches 443, 446 via the IP network 433. The headquarters 403 can be provided at one location, e.g., Chicago, and the branches 443, 446 can be provided at different locations, e.g., Los Angeles and Washington, D.C. Despite the different locations of the headquarters 403 and branches 443, 446, a media communication can be recorded to a single voice endpoint recorder 439 using the conference bridge 409 and IP network 433. Note that the headquarters 403 includes a similar system as shown in FIG. 3. That is, the headquarters 403 includes soft switch 406, conference bridge 409, company network 416 and agent phones 419, 423, 426.

Agent phones 449, 453 within the branches 443, 446 can receive media communications from within the contact center premises 403 or from customer phone 429. The soft switch 406 can send a command to the agent phones 449, 453 instructing the agent phones 449, 453 to transmit media communication through the conference bridge 409 via the IP network 433. The soft switch 406 also can send a command to the conference bridge 409 via the company network 416 to duplicate and transmit the media communication associated with the agent phones 449, 453 to the voice endpoint recorder 439 using the IP network 433. The operation of the system 400 will also be described in greater detail in relation to FIGS. 8 and 9.

Figure 5:
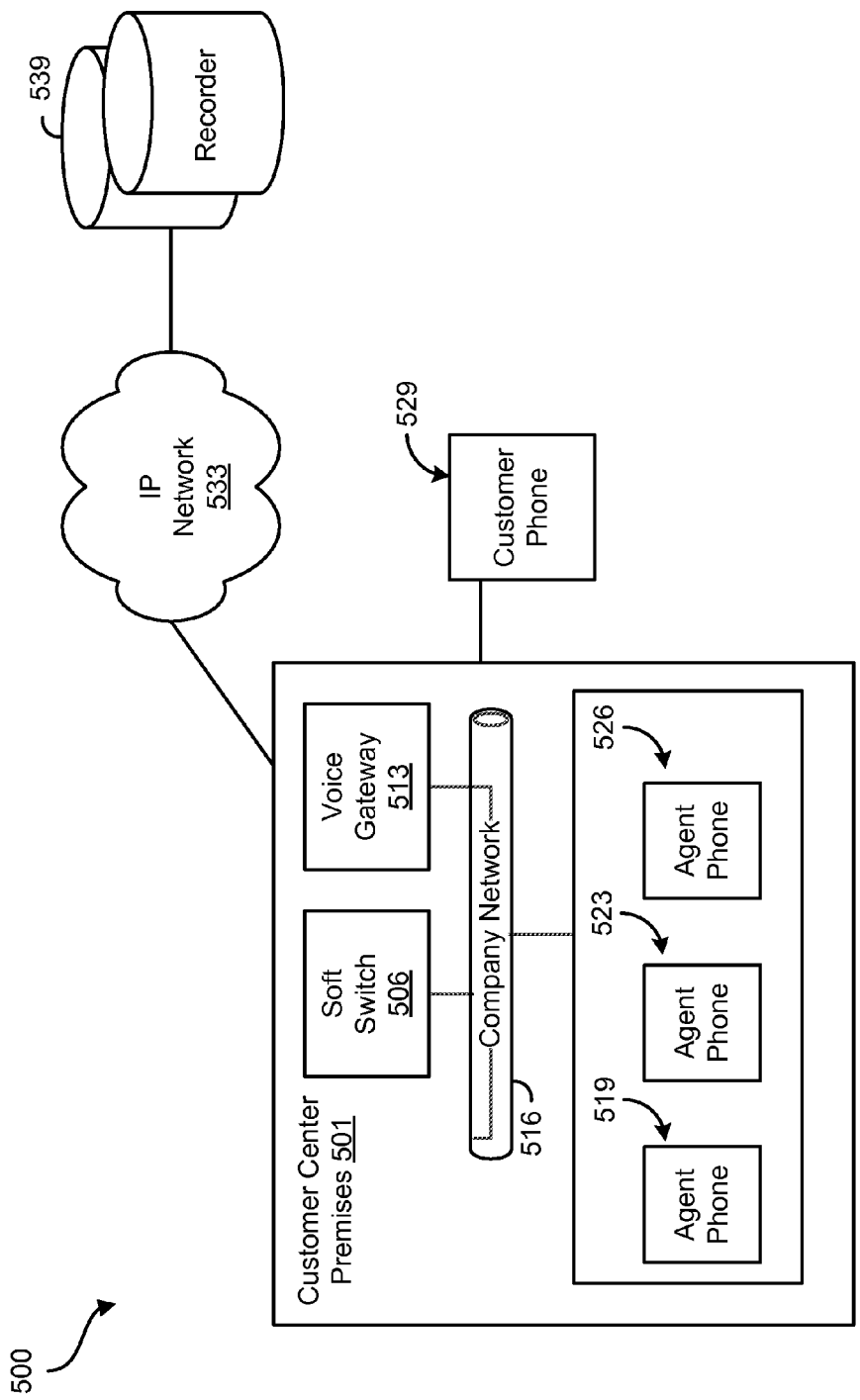
FIG. 5 is a schematic diagram of an embodiment of a system in which media communication at a contact center can be recorded by a voice endpoint recorder using a phone.

FIG. 5 is a schematic diagram of an embodiment of a system in which media communication at a contact center can be recorded by a voice endpoint recorder using an agent's phone. The agent's phone can be an IP phone that can be an IP based hardware phone or an IP based soft phone running on an agent's personal computer. The system 500 is similar to the system 300 in FIG. 3 described above. That is, the system 500 includes a contact center premises 501, customer phone 529, company network 516, IP network 533, voice gateway 513, and endpoint recorder 539.

As in FIG. 5, the soft switch 506 manages incoming calls and routes the incoming calls to agent phones 519, 523, 526 via the company network 516. The soft switch 506 communicates with the agent phones 519, 523, 526 to determine whether the agent phones can duplicate and transmit media communications to an endpoint recorder 539. If the agent phones have the capability, the soft switch 506 instructs the agent phones 519, 523, 526 via the company network 516 to duplicate and transmit media communications associated with the incoming calls to the endpoint recorder 539 using the IP network 533. Alternatively or additionally, the soft switch 506 can receive instructions for recording the media communication from the voice endpoint recorder 539 via the IP network 533. In turn, the soft switch 506 sends a command based on the received instructions to the agent phones 519, 523, 526. The operation of the system 500 is further described in relation to FIGS. 8 and 10.

Figure 6:
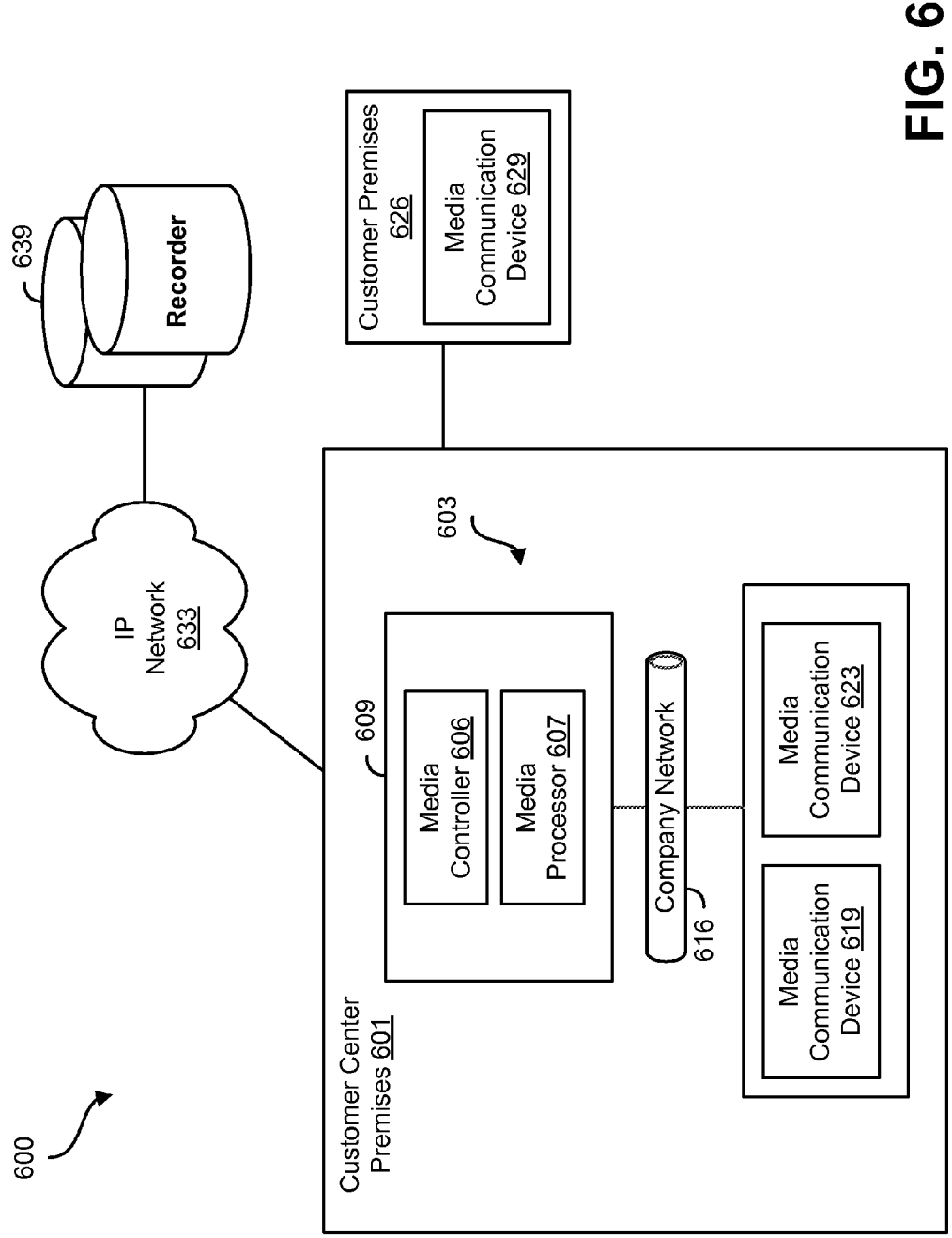
FIG. 6 is a schematic diagram of an embodiment of a system in which media communication at a company can be recorded by a multi-media endpoint recorder using a media application server.

FIG. 6 is a schematic diagram of an embodiment of a system in which media communication can be recorded by a media endpoint recorder using a media application server. The media communications can include, but are not limited to, audio, video, and text communications. The system 600 comprises a company premises 601 and a customer premises 626 that includes a media communication device 629. The media communications from the media communication device 629 can be routed to a media application server 609. The media application server 609 and media communication devices 619, 623 communicate with each other via a company network 616. The media communication system 603 communicates with a media endpoint recorder 639 via an IP network 633.

In this embodiment, the media application server 609 includes a media controller 606 and a media processor 607. The media controller 606 processes media communications, identifies the type of media communications, and routes the media communications to media communication devices 619, 623 and media processor 607, via the company network 616. The media controller 606 can send a command to the media communication devices 619, 623 via the company network 616, instructing the media communication devices 619, 623 to transmit the media communications through the media application server 609 via the company network 616. Once the media application server 609 receives media communications, the media processor 607 duplicates and transmits the media communications to the media endpoint recorder 639 using the IP network 633. Alternatively or additionally, the media controller 606 can receive instructions for recording the media communications from the media endpoint recorder 639 via the IP network 633. In turn, the media controller 606 sends a command based on the received instructions to the media processor 607. The operation of the system 600 is further described in relation to FIGS. 7 and 10.

Alternatively or additionally, the media communication devices 619, 623 can have the capabilities of duplicating and transmitting the media communications to a media endpoint recorder 639. For example, the media controller 606 manages the media communications and routes the media communications to the media communication devices 619, 623 via the company network 616. The media controller 606 communicates with the media communication devices 619, 623 to determine whether the communication devices 619, 623 can duplicate and transmit the media communications to a media endpoint recorder 639. If the communication devices 619, 623 have the capability, the media controller 606 instructs the media communication devices 619, 623 via the company network 616 to duplicate and transmit media communications to the media endpoint recorder 639 using the IP network 633. Alternatively or additionally, the media controller 606 can receive instructions for recording the media communications from the media endpoint recorder 639 via the IP network 633. In turn, the media controller 606 sends a command based on the received instructions to the communication devices 619, 623.

Figure 7:
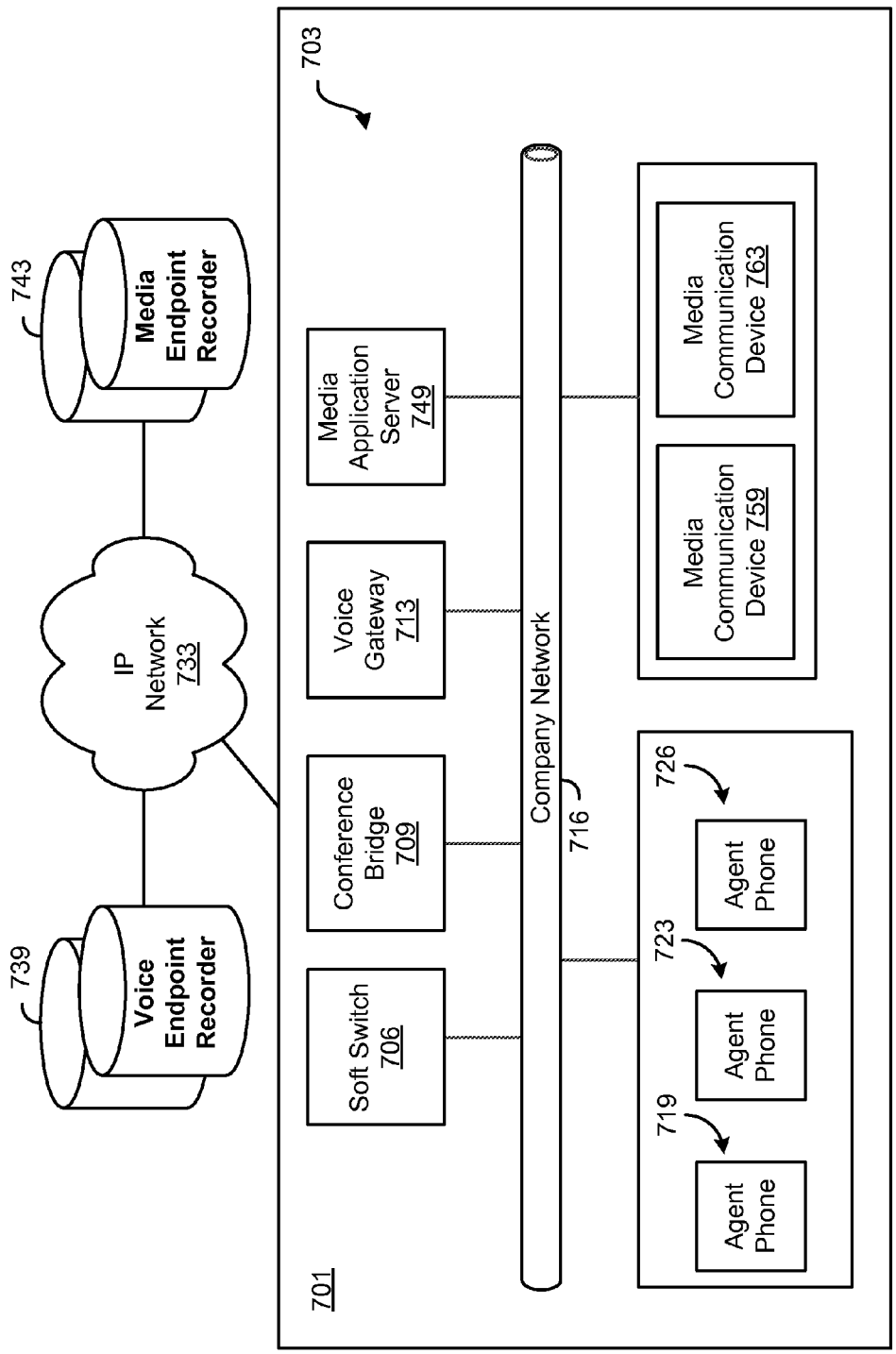
FIG. 7 is a schematic diagram of an embodiment of a system in which both media communication and non-voice media communication can be recorded by a multi-media endpoint recorder in a contact center.

FIG. 7 is a schematic diagram of an embodiment of a system in which both media communication and non-voice media communication can be recorded by a multi-media endpoint recorder in a contact center using a soft switch, conference bridge, agent phones, media communication devices, and media application server, respectively, via an IP network. The multi-media recorder 743 can include both voice and non-voice media recorders. The soft switch 706, conference bridge 709, agent phones 719, 723, 726, media communication devices 759, 763, and media application server 749 communicate with each other via a company network 716.

In one scenario, for example, calls from a customer phone can be routed to a voice gateway 713, which can route the calls to the soft switch 706. The soft switch 706 receives incoming calls and routes the calls to the agent phones 719, 723, 726. The soft switch 706 communicates with the conference bridge 709 via the company network 716. The IP telephony system 703 communicates with the multi-media endpoint recorder 743 via an IP network 733. In this example, the soft switch 706 is operative to send a command to the agent phones 719, 723, 726 and voice gateway 706 via the company network 716, instructing the agent phones 719, 723, 726 and voice gateway 706 to transmit media communications associated with the incoming calls through the conference bridge 709 via the company network 716. The soft switch 706 also sends a command to the conference bridge 709 via the company network 716 to duplicate and transmit the media communication to the multi-media endpoint recorder 743 using the IP network 733.

In another scenario, for example, the soft switch 706 can have capabilities of a conference bridge, as mentioned above. The soft switch 706 can duplicate and transmit the media communication without the conference bridge 709 to the multi-media endpoint recorder 743 using the IP network 733.

In yet another scenario, for example, the soft switch 706 communicates with the agent phones 719, 723, 726 to determine whether the phones can duplicate and transmit media communications to the multi-media endpoint recorder 743. If the agent phones have the capability, the soft switch 706 instructs the agent phones 719, 723, 726 via the company network 716 to duplicate and transmit media communications associated with the incoming calls to the multi-media endpoint recorder 743 using the IP network 733.

In yet another scenario, for example, the media application server 749 receives incoming non-voice media communications, identifies the type of non-voice media communications, and routes the non-voice media communications to media communication devices 759, 763 via the company network 716. The media application server 749 can send a command to the media communication devices 759, 763 via the company network 716, instructing the media communication devices 759, 763 to transmit the non-voice media communications through the media application server 749 via the company network 716. The media application server 749 duplicates and transmits the non-voice media communications to the multi-media endpoint recorder 743 using the IP network 733.

In yet another scenario, for example, the media communication devices 759, 763 can have the capabilities of duplicating and transmitting the non-voice media communications to the multi-media endpoint recorder 743. For example, the media application server 749 manages the non-voice media communications and routes the non-voice media communications to the media communication devices 759, 763 via the company network 716. The media application server 749 communicates with the media communication devices 759, 763 to determine whether the communication devices 759, 763 can duplicate and transmit the non-voice media communications to the multi-media endpoint recorder 743. If the communication devices 759, 763 have the capability, the media application server 749 instructs the media communication devices 759, 763 via the company network 716 to duplicate and transmit the non-voice media communications to the multi-media endpoint recorder 743 using the IP network 733.

Figure 8:
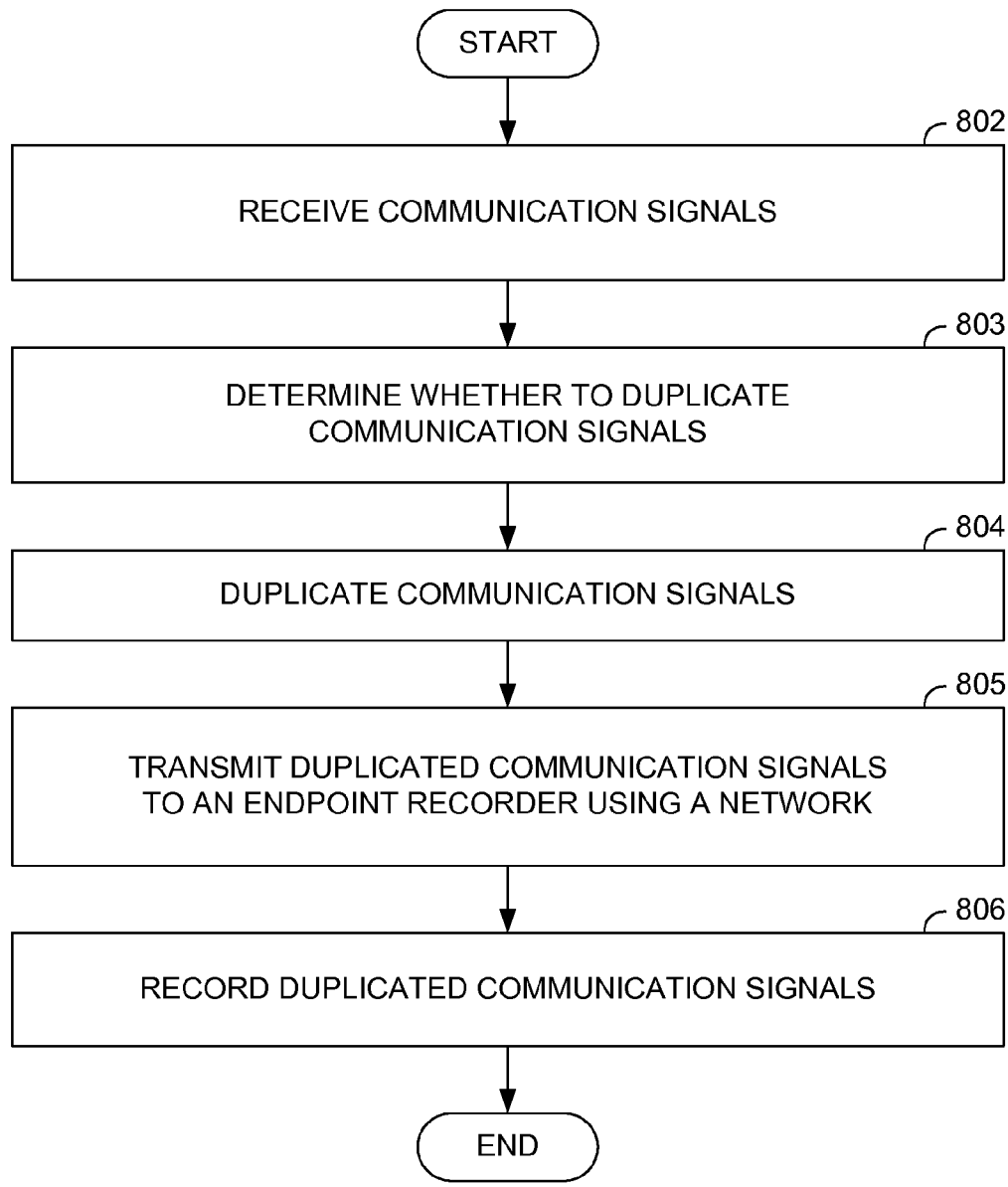
FIG. 8 is a flow diagram that illustrates an example of operation of a system such as shown in FIG. 2.

FIG. 8 is a flow diagram that illustrates an example of operation of a system such as shown in FIG. 2. Beginning with block 802, communication signals are received in a contact center. In block 803, the contact center determines whether to duplicate the communication signals such as such as by using the media controlling/processing/distributing devices 213, 231, as shown in FIG. 2. Alternatively or additionally, a recording device can provide instructions to the media controlling/processing/distributing devices 213, 231 for recording the communication signals. In block 804, the contact center duplicates the communication signals such as by using the media controlling/processing/distributing devices 213, 231 or communication devices 209, 229. In block 805, the duplicated communication signals are transmitted to an endpoint recorder using a network. In block 806, the end point recorder records the duplicated communication signals.

Figure 9:
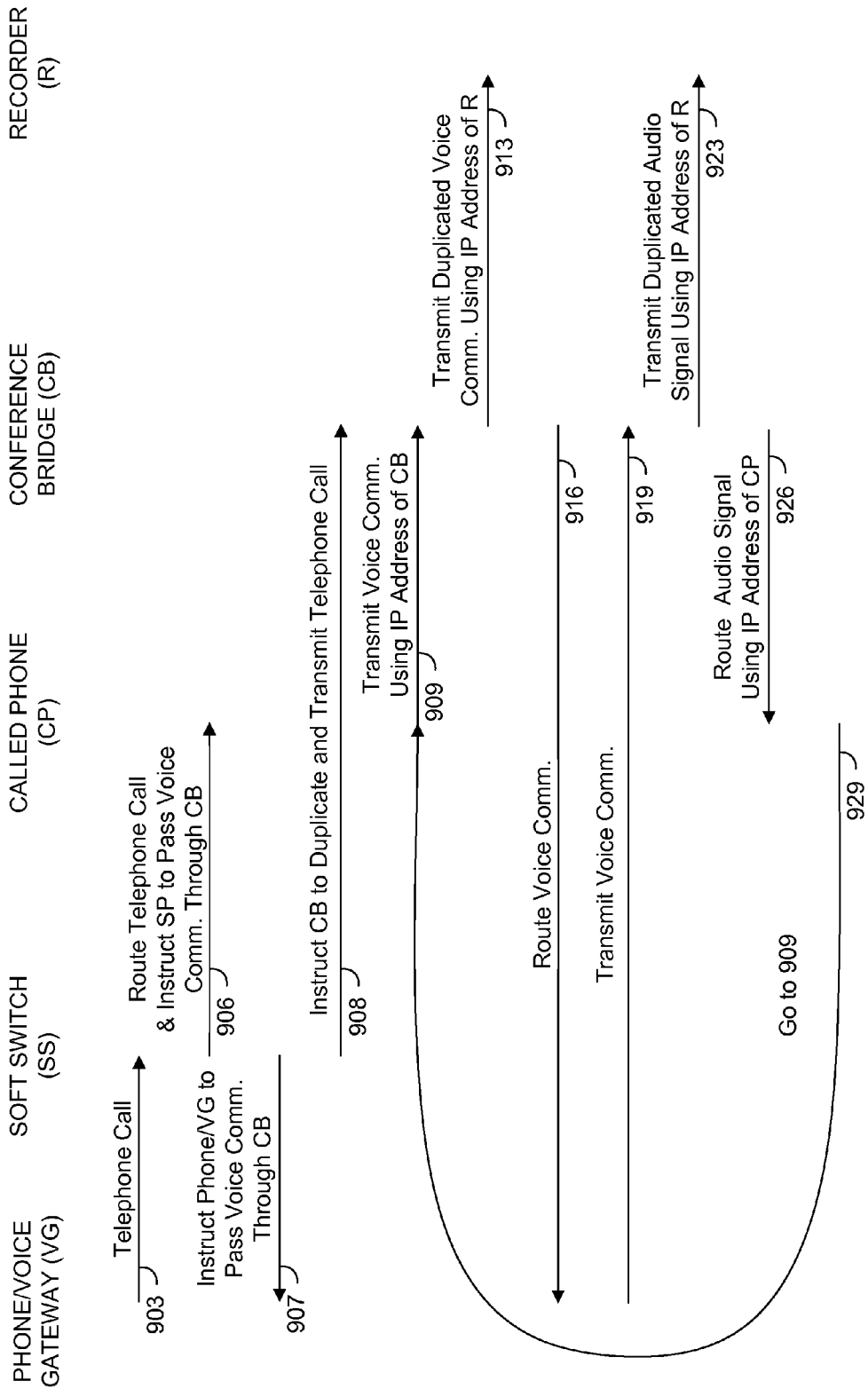
FIG. 9 is a sequence diagram of an embodiment of a system such as shown in FIGS. 3 and 4, in which a media communication can be recorded using a conference bridge.

FIG. 9 is a sequence diagram of an embodiment of a system such as shown in FIGS. 3 and 4, in which a media communication can be recorded using a conference bridge. Beginning with event 903, a telephone call can be originated from a calling customer or agent phone. If the telephone call is made from a calling customer phone, the telephone call is passed through a voice gateway, which routes the telephone call to a soft switch of a contact center premises. If the telephone call is made from a calling agent phone, for example, within the contact center premises, the soft switch of the contact center premises receives the telephone call. In both situations, the soft switch routes the telephone call to a called phone within the contact center premises and instructs the called phone to transmit the media communication associated with the telephone call through a conference bridge, as shown at event 906. At event 907, the soft switch can instruct either the calling agent phone or the voice gateway to transmit the media communication through the conference bridge. The instruction to the called phone and the voice gateway can include an Internet Protocol (IP) addresses and the ports of the conference bridge.

At event 908, the soft switch instructs the conference bridge to duplicate and transmit the media communication to a voice endpoint recorder. The instruction to the conference bridge can include an IP address and a port of the voice endpoint recorder. At event 909, the called phone transmits the media communication to the conference bridge such as by using the IP address/port of the conference bridge. At event 913, the conference bridge duplicates the media communication from the called phone and transmits the duplicated media communication to the recorder such as by using the IP address/port of the voice endpoint recorder. The recorder receives and records the duplicated media communication from the called phone. Notably, the voice endpoint recorder can be located anywhere inside or outside the contact center premises as long as the recorder is connected to an IP network connected to the contact center.

At event 916, the conference bridge routes the media communication from the called phone to the calling agent phone or the voice gateway. At event 919, the calling agent phone or the voice gateway transmits the media communication to the conference bridge such as by using the IP address and port of the conference bridge. At event 923, the conference bridge duplicates the media communication from the calling agent phone or the voice gateway and transmits the duplicated media communication to the recorder such as by using an IP address and a port of the recorder. The recorder receives and records the duplicated media communication from the calling agent phone or the voice gateway. At event 926, the conference bridge routes the media communication from the calling agent phone or the voice gateway to the called phone of the contact center premises. Thereafter, the sequence is returned to event 909 so that the called phone can transmit the media communication to the conference bridge as instructed by the soft switch, as shown at event 929.

Figure 10:
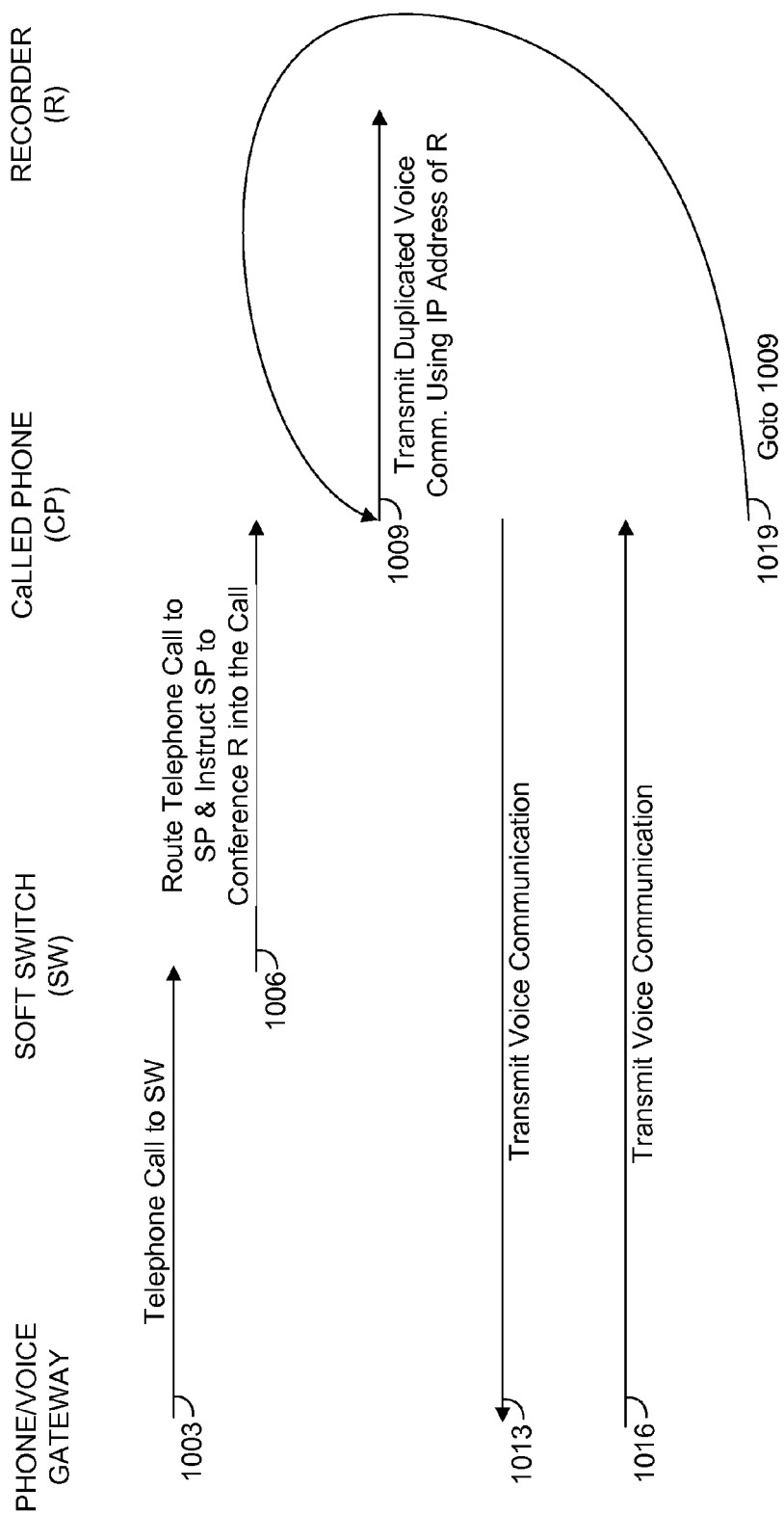
FIG. 10 is a sequence diagram of an embodiment of a system, such as shown in FIG. 5, in which a media communication can be recorded using a phone.

FIG. 10 is a sequence diagram of an embodiment of a system, such as shown in FIG. 5, in which a media communication can be recorded using an agent's phone. Beginning with event 1003, a telephone call is originated from a calling agent or customer phone to a soft switch. In this embodiment, a phone of a called agent (called phone) is assumed to have media duplicating capabilities. Alternatively or additionally, the soft switch can communicate with a phone of a contact center premises to determine whether the phone has the media duplicating capabilities. At event 1006, the soft switch routes the media communication associated with the telephone call to the called phone, and instructs the called phone to duplicate and transmit the duplicated media communication to a voice endpoint recorder. The instruction to the second agent phones includes, but is not limited to, an IP address and a port of the voice endpoint recorder.

At event 1009, the called phone receives the media communication from the calling agent phone or the voice gateway, duplicates the media communication and transmits the duplicated media communication to the recorder such as by using the IP address and port of the recorder. The recorder receives and records the duplicated media communication from the calling agent phone or the voice gateway. At event 1013, the called phone transmits the media communication to the calling agent phone or the voice gateway. The called phone can duplicate its media communication and transmits the duplicated media communication to the recorder. The recorder receives and records the duplicated media communication from the called phone. At event 1016, the calling agent phone or the voice gateway transmits its media communication to the called phone. At event 1019, the sequence is returned to event 1009 during which the called phone receives the media communication from the calling agent phone or the voice gateway, duplicates the media communication and transmits the duplicated media communication to the recorder.

Figure 11:
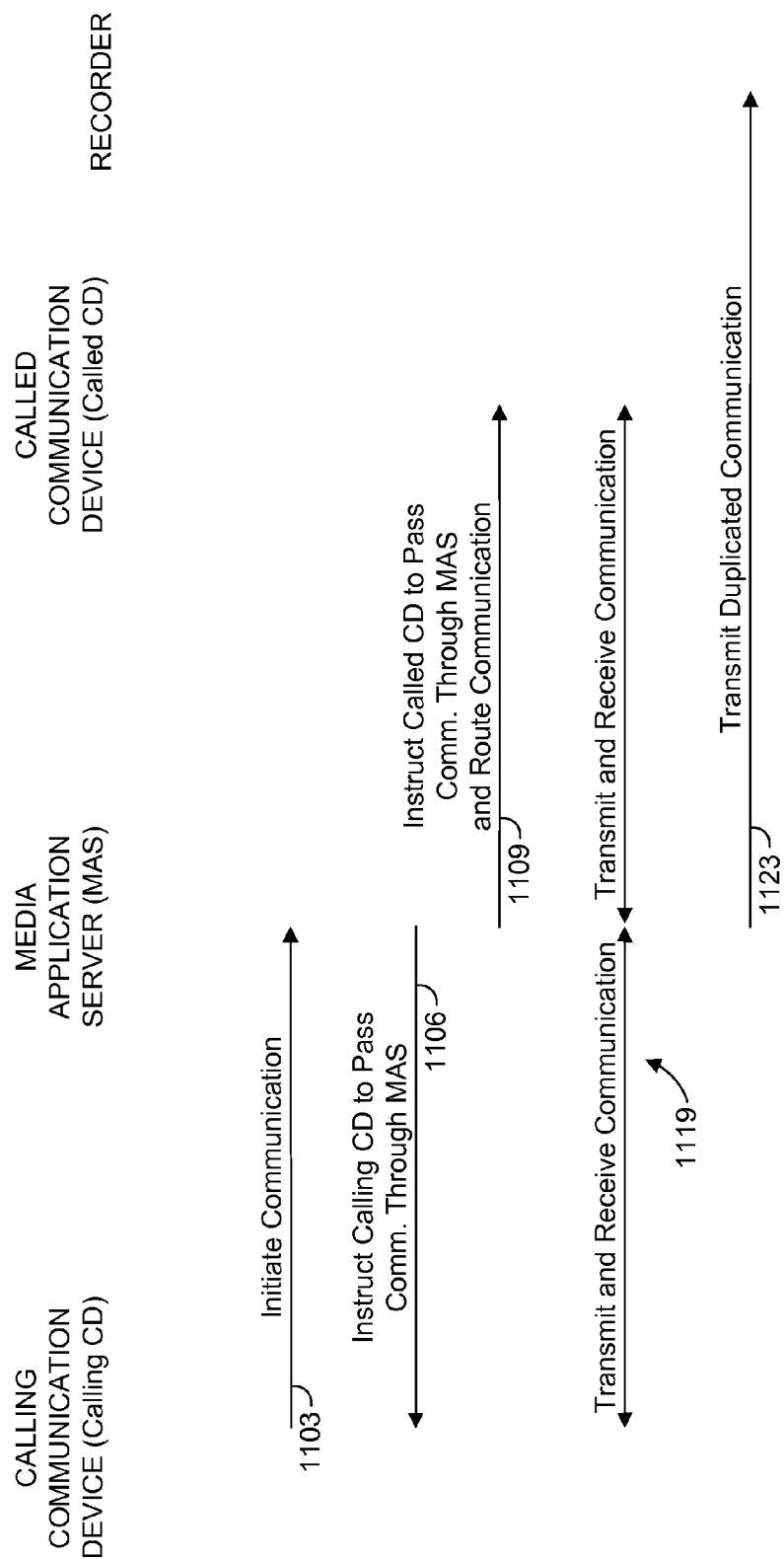
FIG. 11 is a sequence diagram of an embodiment of a system, such as shown in FIG. 6, in which a media communication can be recorded via a media application server.

FIG. 11 is a sequence diagram of an embodiment of a system, such as shown in FIG. 6, in which a media communication can be recorded via a media application server. Beginning with event 1103, a media communication can be initiated from a calling customer or agent communication device. At event 1106, the media application server receives the media communication and instructs the calling communication device to transmit media communication through the media application server. At events 1109, the media application server routes the media communication to a called agent communication device and instructs the called agent communication device to transmit the media communication through a media application server. The instructions to the agent communication device can include an IP address and a port of the media application server.

At event 1119, the calling and called communication devices transmit and receive the media communications to and from the media application server. At event 1123, the media application server duplicates the media communications between the calling and called communication devices and transmits the duplicated media communications such as by using an IP address and a port of a media endpoint recorder. The media endpoint recorder receives and records the duplicated media communication from the calling and called communication devices.

It should be emphasized that the above-described embodiments are merely possible examples of implementations, merely set forth for a clear understanding of the principles of the invention. Many variations and modifications may be made to the above-described embodiments without departing substantially from the spirit and principles of the invention. All such modifications and variations are intended to be included herein within the scope of this disclosure and the present invention and protected by the following claims.

Therefore, having thus described the invention, at least the following is claimed:

1. A method for recording a communication, comprising the steps of:
   receiving an incoming Internet Protocol (IP) media communication;
   routing the incoming IP media communication to a communication device in a contact center over an IP network;
   transmitting the incoming IP media communication through a media application server residing on the IP network as an intermediate component between the communication device and a source of the incoming IP media communication;
   duplicating the incoming IP media communication at the media application server;
   selecting, at the media application server, a recording device to record the duplicated media communication;
   transmitting the duplicated media communication via the media application server to a selected recording device over the IP network; and
   recording the duplicated media communication at the selected recording device.

2. The method as defined in claim 1, further comprising instructing the media application server to duplicate and transmit the media communications.

3. The method as defined in claim 2, where in the instructions are transmitted from one of a soft switch and a recording device.

4. The method as defined in claim 1, further comprising transmitting media communication via the media application server from the communication device to a customer phone using an IP address associated with the customer phone.

5. The method as defined in claim 1, wherein the step of transmitting the duplicated media communication to the selected recording device is performed by the media application server using an IP address and a port of the selected recording device.

6. The method as defined in claim 5, further comprising:
   duplicating the media communication; and
   transmitting the duplicated media communication to the selected recording device using an IP address of the selected recording device to be recorded.

7. The method as defined in claim 1, further comprising transmitting media communication via the media application server to the communication device using an IP address of the communication device.

8. The method as defined in claim 7, further comprising receiving the media communication via the media application server from the communication device.

9. A system for recording a communication, comprising:
   a communication device being operative to receive an incoming media call, the communication device being in a contact center; and
   a media application server being operative to receive media communications associated with the incoming media call between the communication device and a calling phone; the media application server residing on an Internet Protocol (IP) network as an intermediate component between the communication device and a source of the incoming media call and being operative to:
   duplicate the media communications via the media application server;
   select, at the media application server, a recording device to record the duplicated media communications; and
   transmit the duplicated media communications over the IP network to the selected recording device.

10. The system as defined in claim 9, further comprising a soft switch being operative to instruct the media application server to duplicate and transmit the media communications.

11. The system as defined in claim 10, wherein the selected recording device is operative to transmit instructions to the soft switch, the soft switch being operative to instruct the media application server to duplicate and transmit the media communications based on the transmitted instructions.

12. The system as defined in claim 10, wherein the media application server transmits Internet Protocol (IP) addresses of the calling phone to the communication device using an IP address of the communication device.

13. The system as defined in claim 12, wherein the media application server transmit media communication to the calling phone using the IP address of the calling phone.

14. The system as defined in claim 9, wherein the media application server transmits the duplicated media communication to the selected recording device using an IP address of the selected recording device.

15. The system as defined in claim 9, wherein the media application server transmits media communication to the communication device using an IP address of the communication device.

16. The system as defined in claim 15, wherein the media application server receives media communication from the calling phone.

17. A system for recording a communication, comprising:
a communication device being operative to receive an incoming Internet Protocol (IP) media call, the communication device being in a contact center;
a media application server being operative to receive media communications associated with the incoming IP media call between the communication device to a calling phone, the media application server residing on an Internet Protocol (IP) network as an intermediate component between the communication device and a source of the incoming IP media call;
a recording device operable to record duplicated media communications; and
a soft switch being operative to instruct the media application server to duplicate and transmit the media communications,
wherein the media application server duplicates the media communications, selects the recording device, and transmits the duplicated media communications over the IP network to the selected recording device.

18. The system as defined in claim 17, wherein the selected recording device is operative to transmit instructions to the soft switch, the soft switch being operative to instruct the media application server to duplicate and transmit the media communications based on the transmitted instructions.

\* \* \* \* \*